United States Patent

[11] 3,576,948

[72] Inventor Norman L. Stauffer
Englewood, Colo.

[21] Appl. No. 735,723
[22] Filed June 10, 1968
[45] Patented May 4, 1971
[73] Assignee Honeywell, Inc.
Minneapolis, Minn.

[54] SYSTEM FOR RECORDING HIGH FREQUENCY SIGNALS ON A RECORDER HAVING A LOWER FREQUENCY RESPONSE
6 Claims, 7 Drawing Figs.

[52] U.S. Cl. .......... 179/15.55
[51] Int. Cl. .......... H04b 1/66
[50] Field of Search .......... 340/174.1 (A), 172.5; 178/6 (BRW); 179/15.55, 15.55 (TC); 325/153, 163; 343/17; 324/77 (A), 77 (B)

[56] References Cited
UNITED STATES PATENTS
2,879,499 3/1959 Ackerland .......... 340/172.5

*Primary Examiner*—Kathleen H. Claffy
*Assistant Examiner*—Jon Bradford Leaheey
*Attorneys*—Arthur H. Swanson and Lockwood D. Burton

ABSTRACT: A device is disclosed for recording high frequency signals on a lower frequency recorder. In accomplishing this, the high frequency signals are amplified and periodically stored in maximum and minimum storage devices. The stored maximum and minimum values of the high frequency signal are then sequentially applied through read amplifying circuitry to the lower frequency recorder which displays the signal retaining the amplitude thereof.

INVENTOR.
NORMAN L. STAUFFER
BY M. Michael Carpenter
ATTORNEY.

INVENTOR.
NORMAN L. STAUFFER

BY [signature]

ATTORNEY.

INVENTOR.
NORMAN L. STAUFFER
BY *[signature]*
ATTORNEY.

SYSTEM FOR RECORDING HIGH FREQUENCY SIGNALS ON A RECORDER HAVING A LOWER FREQUENCY RESPONSE

The present invention relates to recording apparatus and, more particularly, to a recording device which is capable of recording very high frequency information on a low frequency recorder while retaining an accurate representation thereof.

Low frequency recording devices, such as oscillographs, are frequently used as a quick-look or display device only. These recorders are less commonly used for detailed analysis and measurement. Thus, the applications for low frequency recorders may be divided into three major categories including: recorders which are used only for post-recording analysis; recorders which are viewed as they are run, but later subjected to analysis; and recorders which are immediately viewed and utilized for immediate decision making. Low frequency recorders satisfy these requirements; however, if the limited frequency response of these recorders were improved, their application could be expanded.

As low frequency recorders of the continuous display category fundamentally require a viewing by an operator, one must be concerned with the recorder to operator interface or coupling. Often the weakest link in the chain is the observer or operator. For example, the number of channels which can be efficiently monitored is obviously an inverse relationship to the linear speed of the recording medium. The efficiency of this monitoring is further decreased by other factors such as display form, the nature of the signal, and length of time that the operator has been viewing the recording medium. As a rule of thumb, one may state that the approximate viewing time for each variable is about one second. Thus, for a 10-inch long viewing area, one could monitor one channel at 10 inches per second or ten channels at one inch per second. Obviously, if most of the signals are simple static traces an operator would be able to monitor a greater number of channels. However, it has been demonstrated that beyond approximately 20 inches per second it becomes very difficult to view and comprehend even one variable. Another relationship contributing to the inability of an operator to observe a continuously recorded trace is the operators capacity to separate or resolve events in the time axis on the moving chart or display. Again, the results depend on nature of the signal being observed and the method used by the observer to monitor the display. However, under most conditions, the time resolution of an observer is about 10 milliseconds. Thus, the minimum distance on a moving chart or display which can be observed is again about 10 inches per second. Naturally, there is some minimum resolution determined not by the observers visual time resolution, but simply by the optical resolution limit of his eye. It has been concluded experimentally that for real time viewing an observer cannot resolve, that is, recognize as an individual event, information above about 100 cycles per second. Thus, above 100 cycles per second one would see sine wave not as individual cycles but as an envelope; pulses loose their identity; while shape or detail is gone and appear only as an event with some specific amplitude. The rise and fall of a square wave will, beyond this frequency limit, appear equally fast and sharp. Thus, the observer is a special type of low pass filter where the time axis resolution is limited but amplitude is retained.

It is therefore, an object of the present invention, to utilize these basic principles for recording high frequency information signals, above the approximate viewing limit of an operator, so that these signals may be presented on a lower frequency recorder or display device having a response well within the visual limit of the operator.

It is another object of the present invention to provide a means for recording a high frequency information signal on a lower frequency recorder.

Still another object of the invention presented herein is to provide a recording apparatus capable of recording a very high frequency information signal on a lower frequency analog recorder utilizing the principle that the amplitude of the analog information is readily observed by an operator while the ability of the operator to observe the time axis resolution of the information is limited.

Yet another of the present invention is to provide a recording device capable of converting a high frequency recorder into a higher frequency recorder.

A further object of this invention is to provide a recording device which is capable of recording low frequency information and presenting the same as a proper representation thereof, while recording high frequency information as a representation which retains the amplitude and compresses the time axis thereof for yielding a visual representation substantially identical to the original signal.

In accomplishing these objects there is provided means for sampling the maximum and minimum value of the high frequency information signal to be recorded. The maximum and minimum values are then stored within storage devices and applied sequentially through read means to a low frequency recorder. Timing means are provided for sequentially applying the stored maximum and minimum values of the high frequency information signal through the read means to the low frequency recorder.

Other objects and many of the attendant advantages of the present invention will become readily apparent to those skilled in the art as a better understanding thereof is obtained by reference to the following detailed description when considered in connection with the accompanying drawings, wherein:

FIGS. 1*a* and 1*b* are pictorial representations illustrating the utility of the recording system of the present invention;

Figure 1A:
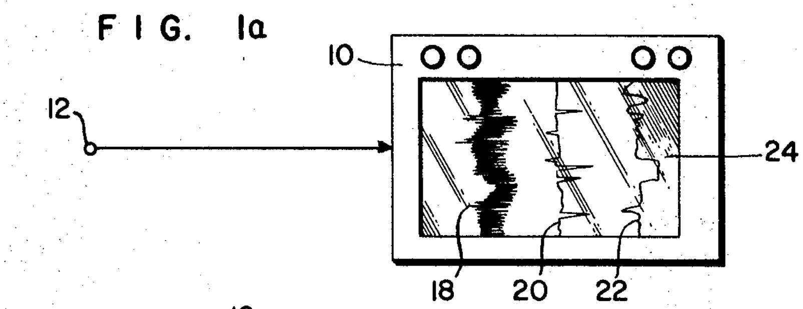
Figure 1B:
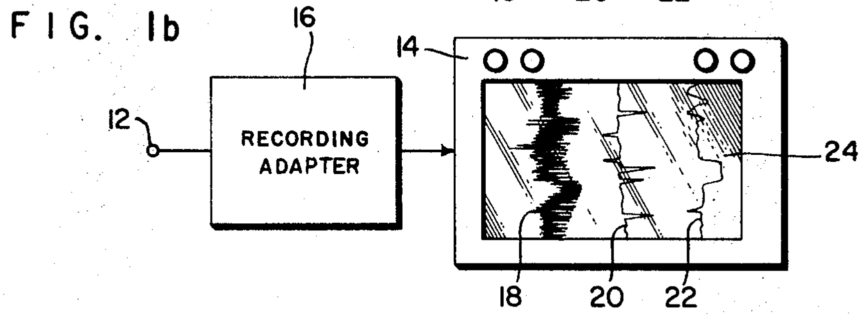

Referring now to the drawings, FIGS. 1*a* and 1*b* show respective recordings systems each capable of yielding substantially identical visual results as explained in more detail hereinafter. A first, high frequency recorder 10 shown in FIG. 1*a* receives a plurality of high frequency input signals from an input source indicated by a high frequency input terminal 12. A second, lower frequency recorder 14 receives the same high frequency information signals through a input terminal 12 via a recording device 16 of the present invention. For purposes of illustration, assume that the high frequency information signals include data varying from a DC level to one megacycle per second and that the first, high frequency recorder 12 is capable of recording this data. High frequency information is illustrated then by the recording trace 18. Low frequency recording traces are represented by curves 20 and 22. The traces 18, 20 and 22 may be formed upon a moving recording medium 24 by suitable means, such as a focused beam of radiation upon a radiation sensitive recording medium. In the example illustrated in FIG. 1*b*, the second, lower frequency recorder 14 is capable of recording frequencies between a DC level and 500 cycles per second. Again, the high frequency information signal is applied from the high frequency input terminal 12 to the lower frequency recorder 14. However, this information is passed via the recording device 16 to the lower frequency recorder 14. The recording device records the low frequency information illustrated by recording traces 20 and 22 identically with the high frequency recorder. It will be noted that the low frequency recorder 14 also records the high frequency information, illustrated by the recording trace 18, in a manner which yields substantially identical visual results with the trace 18 recorded on the high frequency recorder 10.

Figure 2:
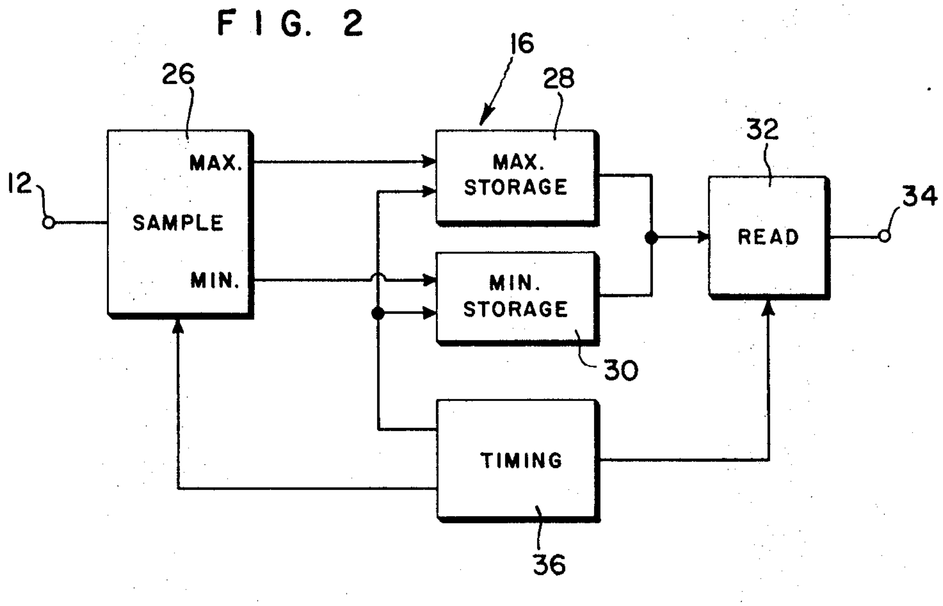
FIG. 2 is a schematic block diagram showing the major components of the recording adapter shown in FIG. 1*b*.

As illustrated in FIG. 2, the recording adapter 16 includes a sampling circuit 26 connected to the high frequency input terminal 12 for receiving the high frequency information signal to be recorded. The sampling circuit separates the maximum and minimum values of the signal and applies these values respectively to a maximum storage device 28 and a minimum storage device 30. The output from each of the maximum and minimum storage devices is connected through a read circuit 32 to an output terminal 34 which, in turn, connects to the low frequency recorder 14. A timing circuit 36 first connects to the sampling circuit 26 for dividing the incoming high frequency information signal into sequential time periods. The sampling circuit 26 is arranged for applying the maximum value of the high frequency information signal, during a predetermined period of time, to the maximum storage device 28 while applying a minimum value thereof, during a second predetermined period of time, to the minimum storage device 30. The timing circuit 36 also connects to the read circuit 32 for periodically reading the maximum and then minimum value of the high frequency signal stored within the maximum and minimum storage devices. Finally, the timing circuit connects to the maximum and minimum storage devices, 28 and 30, for removing the stored signal therein after each periodic application to the read circuit 32.

The recording adapter of FIG. 2 is arranged for alternately storing a maximum signal and then reading the stored signal. In this arrangement, the minimum information signal is stored during the time that the maximum information signal is read; while the maximum information signal is stored during the time that the minimum information signal is read. This allows the high frequency information signal to be compressed onto a predetermined number of lower frequency cycles; while the amplitude thereof is retained by the recording device 16 substantially equal to the amplitude of the original signal.

Figure 3:
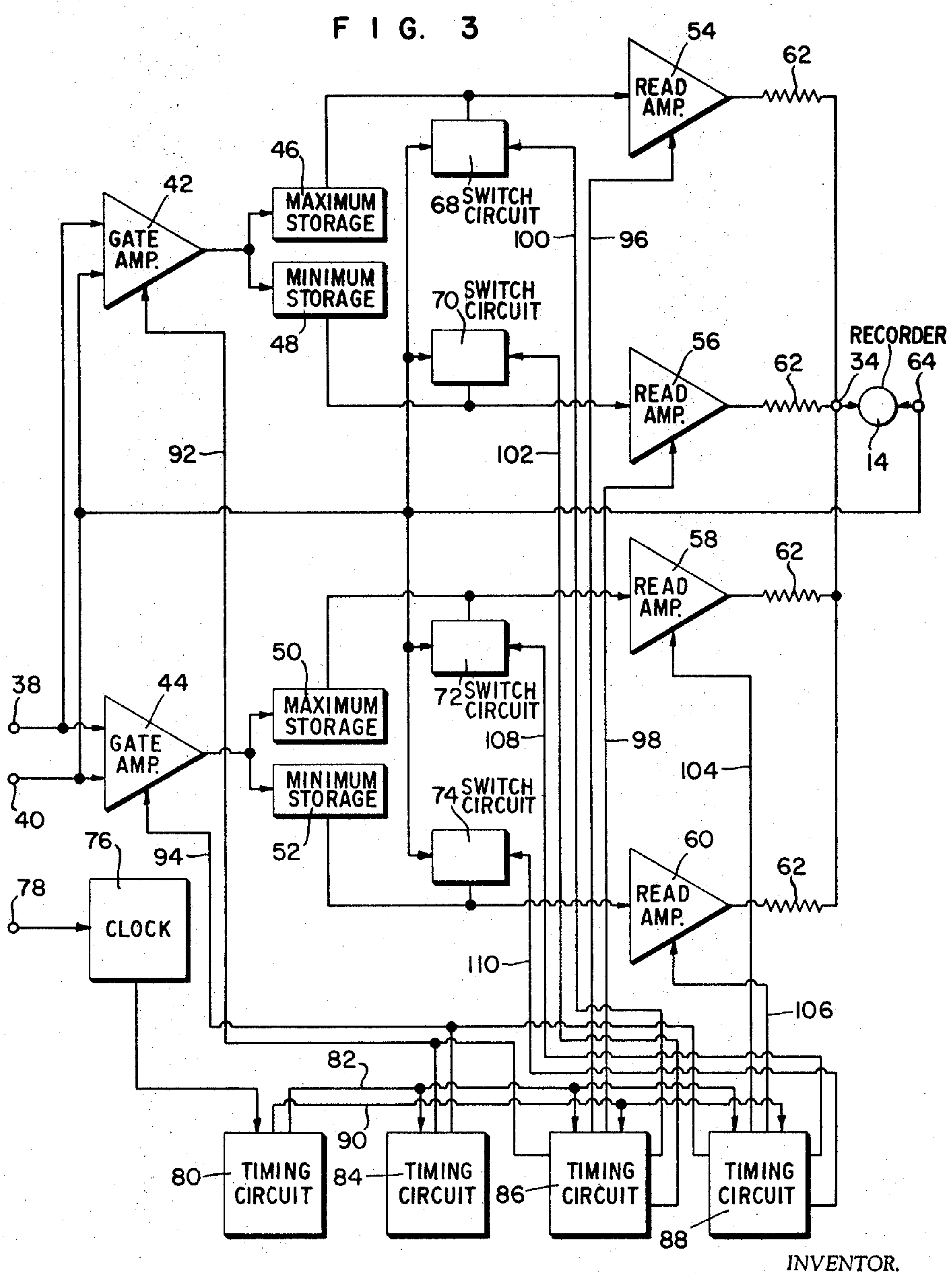
FIG. 3 is a logic circuit diagram showing the present invention, as illustrated in FIG. 2, in further detail.

In the preferred embodiment, it has been found that the storage of the maximum and minimum signal is easily achieved during the same time period. Thus, the high frequency information signal may be stored within maximum and minimum storage devices during a first time period and thereafter read from these devices during a first and second portion of a subsequent time period. In this arrangement, a second set of circuitry is provided for storing the maximum and minimum values of the high frequency information signal during the time that the maximum and minimum values are being read from the first set of circuitry. Thus, a continuous output of information is provided from the recording adapter 16 to the lower frequency recorder 14. Referring to FIG. 3, the details of the preferred embodiment of the present invention are shown. The high frequency input terminal 12 is connected to input terminals 38 and 40 of the recording device 16. The input terminal 40 is subsequently connected to a source of reference potential, such as ground. A first gated amplifier 42 connects to the input terminals 38 and 40, while a second gated amplifier 44 is parallelly connected with the first amplifier 42 to the first and second terminals 38 and 40. The output of the first gated amplifier 42 connects to a first storage device including a first maximum storage device 46 and a first minimum storage device 48. In a similar manner, the output of the second gated amplifier is connected to a second maximum storage device 50 and a second minimum storage device 52. The output of each of the respective storage devices is individually connected to read amplifiers 54, 56, 58, and 60. The read amplifiers are substantially similar to the gated amplifiers 42 and 44 which form the sampling circuit 26. The output of the each read amplifier connects through a biasing resistor 62 to the output terminal 34 of the recording adapter 14 and then to the low frequency recorder 14. A second terminal 64 of the recorder 14 connects to the reference potential at the input terminal 40.

Switching circuits 68, 70, 72, and 74 are connected from the output of each maximum and minimum storage device to the reference potential at terminal 40. Each switching circuit 68, 70, 72, and 74 removes the maximum or minimum signal stored within the associated storage device upon receipt of an appropriate input signal. The timing circuit 36, shown in FIG. 2 is connected to the first gated amplifier 42 and second gated amplifier 44, the switching circuits 68, 70, 72, and 74, and the read amplifiers 54, 56, 58, and 60. The timing circuit 36 includes a clock circuit 76 which may take the form of a flip-flop driven by a reference signal applied to an input terminal 78 thereof from a suitable source, such as a frequency generator, not shown. The clock circuit 76 connects to a first timing circuit 80, for example, a J-K flip-flop. The output of the first timing circuit 80 connects over a timing line 82 to a second timing circuit 84, formed from a flip-flop similar to the timing circuit 80. Timing line 82 also connects to a third timing circuit 86 and a fourth timing circuit 88. The first timing circuit 80 is connected over a timing line 90 to the third and fourth timing circuits 86 and 88. The output of the second timing circuit 84 is applied over a timing line 92 to the first gated amplifier 42 and the third timing circuit 86. A second output from the second timing circuit 84 is applied over a timing line 94 to the second gated amplifier 44 and the fourth timing circuit 88.

The third and fourth timing circuits, 86 and 88, are substantially similar, each having two output terminals for providing enabling signals to the read amplifiers and two output terminals for providing enabling signals to the switching circuits. The third timing circuit 86 operates in conjunction with the first gated amplifier 42 and connects via a timing line 96 to the first read amplifier 54. A second output thereof is connected by a timing line 98 to the second read amplifier 56. In a similar manner, a third output from the third timing circuit connects via timing line 100 to the first switching circuit 68; while a fourth output is connected by a timing line 102 to the second switching circuit 70. The outputs from the fourth timing circuit 88 connect similarly to the switching circuits 72 and 74, and read amplifiers, 58 and 60, associated with the second gated amplifier 44. That is, an output from the fourth timing circuit 88 is connected over a timing line 104 to the third read amplifier 58 while the second output connects over a timing line 106 to the fourth read amplifier 60. A third output connects via line 108 to the switching circuit 72, and a fourth output connects through a timing line 110 to the switching circuit 74.

Figure 4:
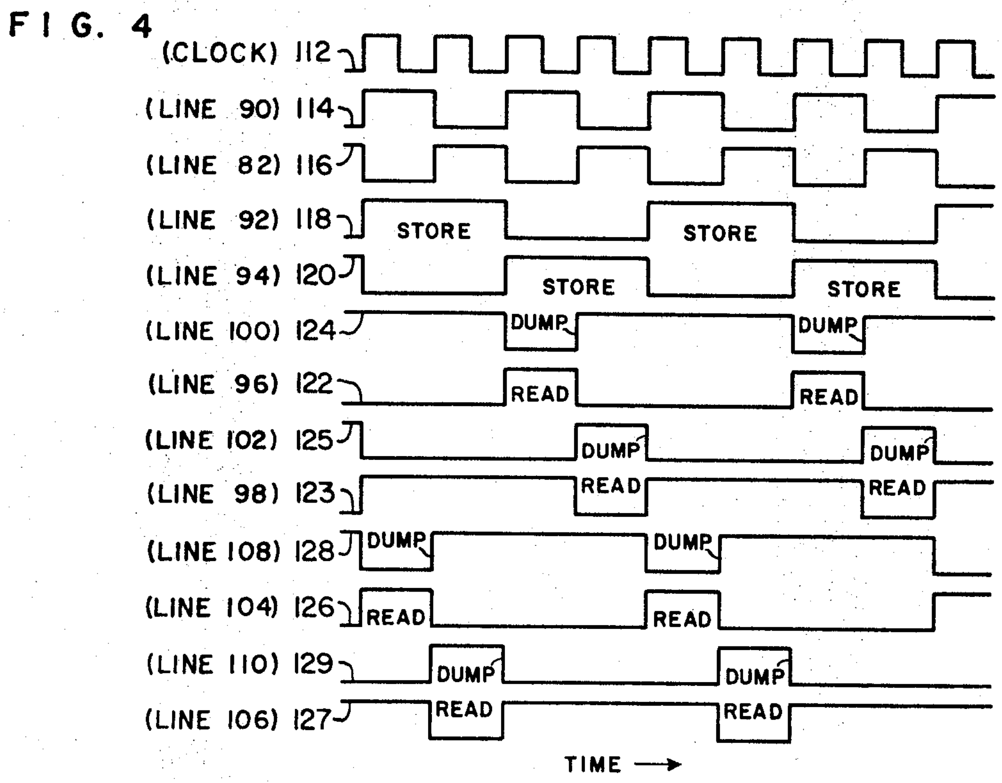
FIG. 4 is a diagram showing various wave forms which illustrate the timing of the logic circuit diagram shown in FIG. 3.

Referring to FIG. 4, the timing sequence of the circuitry illustrated in FIG. 3 is shown. The output of the clock circuit 76 is shown at 112 as a repetitive square wave. This signal is applied to the first timing circuit 80 whose output over timing lines 90 and 92 is represented by the curves 114 and 116, respectively. The output signals from the second timing circuit 84 are shown at 118 and 120 as they appear on the timing lines 92 and 94, respectively. The signals appearing on timing lines 96 and 98 which are applied to the read amplifiers 54 and 56 are shown respectively at 122 and 123; while the signals on timing lines 100 and 102 which are applied to the switching circuits 68 and 70 are shown at 124 and 125. Similarly, the signals from the fourth timing circuit 88, as applied over lines 104, 106, 108, and 110 are shown at 126, 127, 128, and 129, respectively. The values of the signal levels shown in FIG. 4 may represent various potentials; but, in the present embodiment, they are +4 and 0 volts DC.

Figure 5:
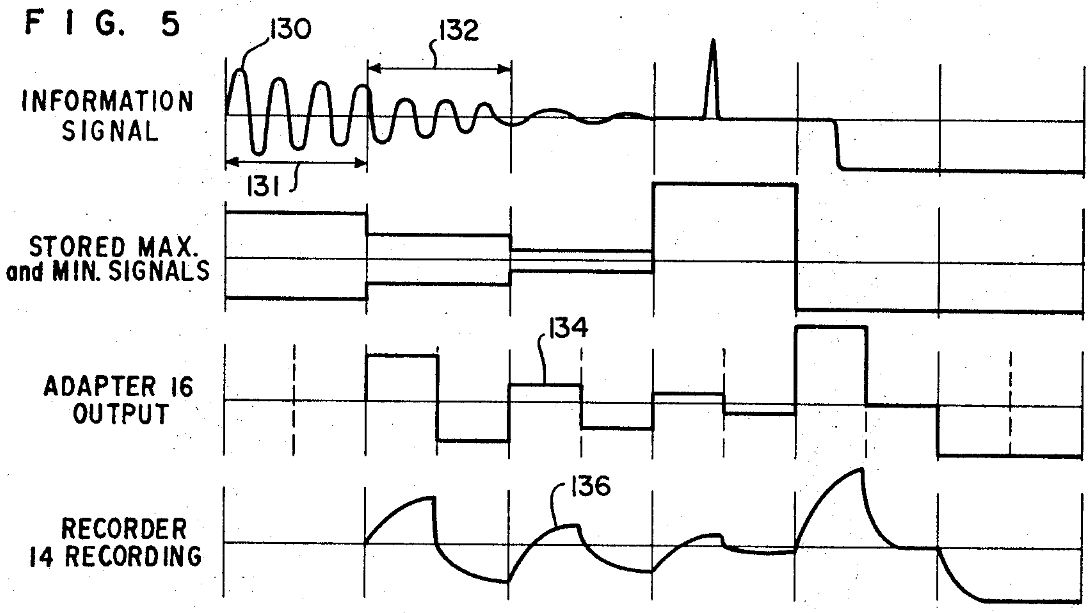
FIG. 5 is a diagram of waveforms useful in illustrating the operation of present invention.

The operation of the recording adapter shown in FIG. 3 is best described by reference to FIG. 5. A high frequency information signal 130 is applied to the first and second gated amplifiers 42 and 44 via the input terminals 38 and 40. The gated amplifiers divide the input signal into predetermined periods of time represented by first and second sampling time periods 131 and 132. The duration of these sampling time periods is established by length of time of the pulses generated by the clock circuit 76 which ultimately forms the pulses of the curves 118 or 120. During the first time period 131, the maximum amplitude of the high frequency information signal is stored within the first maximum storage device 46; while the minimum amplitude is stored within the first minimum storage device 48. In a similar manner, the second maximum and minimum storage devices 50 and 52 store the maximum and minimum high frequency information signal during the second sampling period 132. During the first half of the second sampling time period, while the second gated amplifier is storing information within the devices 50 and 52, the read amplifier 54 applies the maximum signal within the storage device 46 to the lower frequency recorder 14. The read amplifier 56 then applies the minimum signal from the storage device 48 to the recorder 14 during the second half of the second sampling time period. This is sequentially repeated during each subsequent time period with the first circuit of the recording device 16 alternately storing the maximum and minimum signal while second circuit reads the previously stored values thereof. The output signal from the recording device 16 which is applied to the lower frequency recorder 14 is illustrated by curve 134. It will be noted that the amplifier of the high frequency information signal has been retained while the time axis thereof has been compressed. The response time of the lower frequency recorder 14 smooths the square wave signal 134 for recording a rounded curve 136 and providing a visual representation of the high frequency information signal 130. It should also be noted that DC response is retained within the recording device 16 of the present invention.

Figure 6:
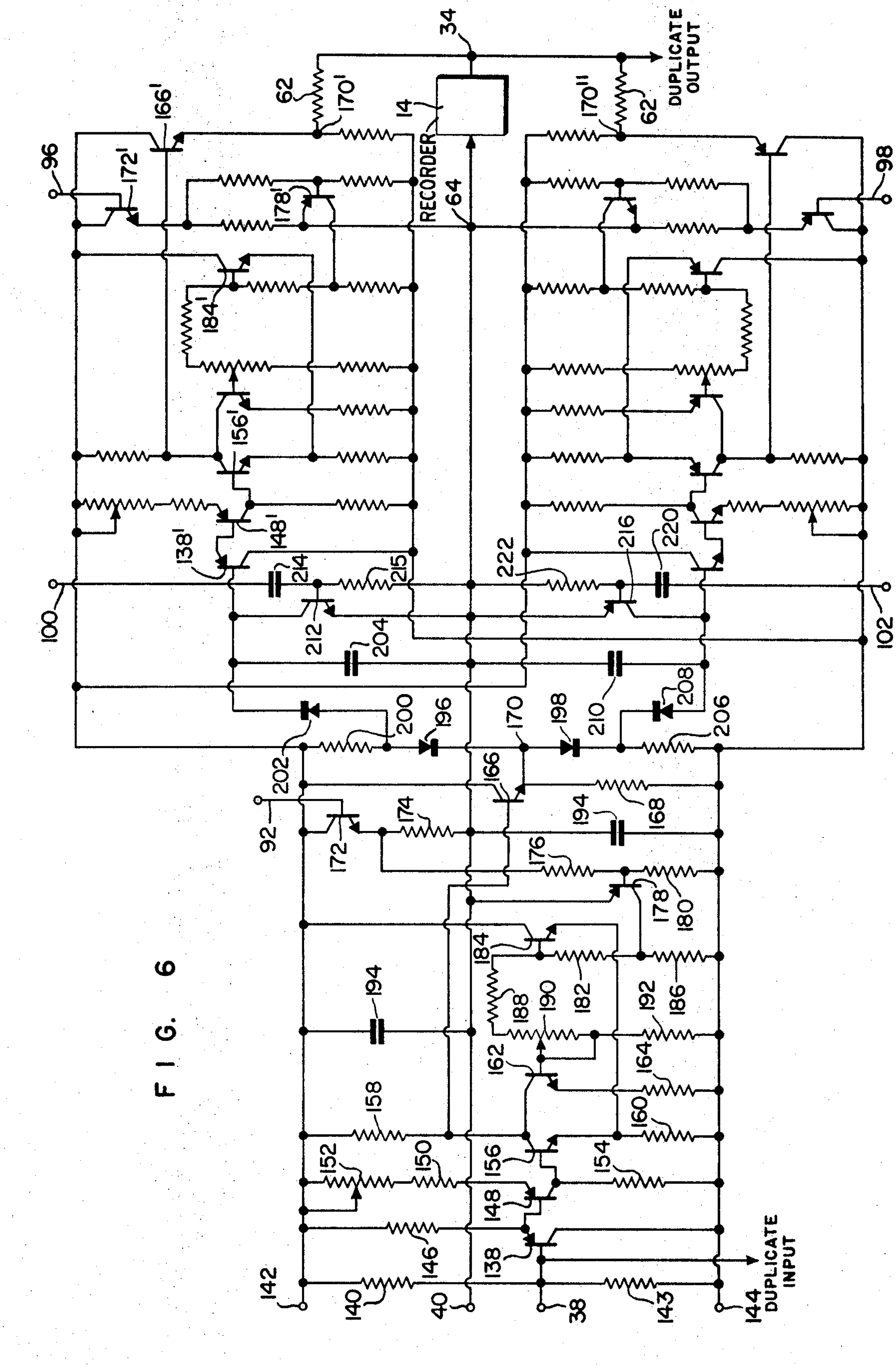
FIG. 6 is a schematic diagram illustrating the components of a portion of the logic circuit diagram shown in FIG. 3.

The details of the first circuit of the recording adapter 16 including the first gated amplifier 42, the first maximum and minimum storage devices 46 and 48, the switching circuits 68 and 70, and the read amplifiers 54 and 56 are shown in FIG. 6. It will be observed that, except for a few minor differences to be noted hereinbelow, the first circuit of the recording adapter 16 is substantially identical in detail to the second circuit thereof. Input terminal 38 connects to the base of a PNP transistor 138, through a first biasing resistor 140 to a source of positive potential 142, and through a second biasing resistor 143 to a source of negative potential 144. The emitter of the transistor 138 connects through a resistor 146 to the positive potential source 142 while the collector thereof connects to the negative potential 144. The emitter of transistor 138 also connects to the base of a second PNP transistor 148 whose emitter is serially connected through a resistor 150 and an adjustable resistor 152 to the source of positive potential 142. The collector of the transistor 148 connects to the source of the negative potential 144 through a resistor 154 and to the base of an NPN transistor 156. The collector of the NPN transistor 156 connects to the positive potential 142 through a resistor 158 while its emitter is connected to the negative potential 144 through a resistor 160. The collector of the transistor 156 also connects to the collector of a second NPN transistor 162 whose emitter connects through a resistor 164 to the negative potential 144. The collector of the transistor 156 is coupled with the base of an NPN transistor 166 having its collector connected directly to the source of positive potential 142 while the emitter thereof is connected to the source of negative potential 144 through a resistor 168. The emitter of the transistor 166 is connected to an output junction 170 which forms the output of the first gated amplifier 42.

The first gated amplifier is controlled by the timing line 92 from the second timing circuit 84 which connects to the base of an NPN transistor 172 therein. The collector of transistor 172 is connected to the source of positive potential 142 while its emitter connects through a biasing resistor 174 to the input terminal 40 and thus to a source of reference potential, such as ground. The emitter of the transistor 172 connects through a resistor 176 to the base of PNP transistor 178 and then to the source of negative potential 144 through a resistor 180. The emitter of the transistor 178 connects to the source of reference potential at terminal 40 while the collector thereof connects through a resistor 182 to the base of an NPN transistor 184. The collector of the transistor 178 also connects to the source of negative potential through a resistor 186. The collector of transistor 184 connects to the source of positive potential 142 while its emitter is connected to the emitter of the transistor 156. The collector connection from the transistor 178 to the base of transistor 184 through the resistor 182 also connects through a resistor 188 to the slide wire of an adjustable resistor 190. The slide arm of the resistor 190 connects to the base of the transistor 162. The second end of the slide wire of the adjustable resistor 190 connects to the source of negative potential 144 through a biasing resistor 192. It will be seen that the transistor 172, transistor 178, and transistor 184 form a switching circuit for turning on the gated amplifier 42 to apply a signal to the first maximum and minimum storage devices 46 and 48. A pair of filtering capacitors 194 are provided, each connected from the source of reference potential at terminal 40 to the source of positive potential 142 and the source of negative potential 144.

The output of the gated amplifier 42 is applied from the junction 170 to the first maximum storage device 46 and the first minimum storage device 48. The junction 170 is connected to the cathode of a diode 196 which forms the input of the first maximum storage device 46. The junction 170 also connects to the anode of a second diode 198 for forming the input of the first minimum storage device 48. A biasing resistor 200 connects the anode of diode 196 to the source of positive potential 142. The anode of diode 196 also connects to the anode of a diode 202 whose cathode connects to one electrode of a memory capacitor 204. The second electrode of the capacitor 204 connects to the point of fixed reference potential at terminal 40. In a similar manner the first minimum storage device 44 includes a biasing resistor 206 connected between the cathode of the diode 198 and the point of negative potential 144. A diode 208 is arranged with its cathode connected to the cathode of diode 198 and its anode connected to one electrode of a memory capacitor 210. The second electrode of the memory capacitor 210 also connects to the point of fixed potential at terminal 40. The electrode of the capacitor 204 which is connected to the cathode of diode 202 also connects to the input of the read amplifier 54. Similarly, the electrode of the memory capacitor 210 which connects to the anode of diode 208 is connected to the input of the read amplifier 56.

The switching circuit 68 includes an NPN transistor 212 whose collector connects to the junction between the memory capacitor 204 and the cathode of the diode 202. The emitter of transistor 212 connects to the point of reference potential at terminal 40. Timing line 100 is connected through a coupling capacitor 214 to the base of the transistor 212. The base of transistor 212 is biased above the point of reference potential at terminal 40 by a biasing resistor 215. The switching circuit 70 includes a PNP transistor 216 having its emitter connected to the source of reference potential at terminal 40 and its collector connected to the junction between an electrode of the memory capacitor 210 and the anode of diode 208. The timing line 102 is connected to the base of the transistor 216 through a coupling capacitor 220. A biasing resistor 222 connects the base of the transistor 216 to the point of reference potential at terminal 40.

The read amplifier 54 is substantially identical to the first gated amplifier 42. The biasing resistors 140, resistor 146, and filtering capacitors 194 have been omitted. With these exceptions, the circuitry of the read amplifier 54 is identical to the circuitry of the first gated amplifier 42. The input to the read amplifier 54 is applied to the base of a transistor 138′. The emitter of transistor 138′ connects to the base of a transistor 148′ whose collector connects to the base of a transistor 156′. The collector of transistor 156′ connects to the base of transistor 166′ having its emitter connected to the output junction of the read amplifier 54 at 170′. The timing line 96 is attached to the base of a transistor 172′, while the emitter thereof connects to the base of a transistor 178′. The collector of the transistor 178′ is connected to the base of a transistor 184′ and the emitter of transistor 184′ connects to the emitter of transistor 156′.

The read amplifier 56 is arranged to receive the output of the first minimum storage device 48. As this output is a negative going signal, the transistors within the read amplifier 56 are arranged to function in a opposite manner from those within the read amplifier 54. That is, the read amplifier 56 utilizes NPN transistors were the read amplifier 54 utilizes PNP transistors and visa versa. Other then this difference, the read amplifier 56 is identical to the read amplifier 54. The output of the read amplifier 56 is applied to an output junction 170″. The timing line 98 connects to the amplifier 56 in a similar manner to the connection of the timing line 96 to the read amplifier 54.

It will be seen that the first circuit of the recording adapter 16 described in FIG. 6 includes the first gated amplifier 42, the maximum and minimum storage devices 46 and 48, the switching circuits 68 and 70, and read amplifiers 54 and 56. Similarly the second circuit thereof includes the second gated amplifier 44, second maximum and minimum storage devices 50 and 52, read amplifiers 58 and 60, and switching circuits 72 and 74. As illustrated in FIG. 3, these similar circuits are each connected to the lower frequency recorder 14 for recording the high frequency information signal received at input terminals 38 and 40. The timing circuits 80, 84, 86 and 88 are connected to each set of circuitry associated with the first and second gated amplifiers for sequentially timing the recording device.

In operation, the high frequency information signal is applied to the input terminals 38 and 40 for application to the input of the gated amplifiers 42 and 44. The gated amplifiers are sequentially operated wherein the signal is first applied to the first maximum and minimum storage devices 46 and 48. Subsequently, the signal is applied to the second maximum and minimum storage devices 50 and 52 by the second gated amplifier 42, as described hereinabove. During the time that the signal is being stored within the storage devices 50 and 52, the read amplifiers 54 and 56, associated with the first gated amplifier 42, amplify the stored signal within storage devices 46 and 48 and apply that signal to the lower frequency recorder 14. While the first gated amplifier is storing the next sequential time period, the read amplifiers 58 and 60 apply the maximum and minimum signal within the storage devices 50 and 52 to the lower frequency recorder 14.

As the operation of the first circuit within the recording adapter 16 is identical to the operation of the second circuit, only the operation of the first circuit will be described herein. For example, if a positive going signal were applied to the input terminal 38, this signal would cause a transistor 138 within the first gated amplifier 42 to turn off thus turning off the transistors 148 and 156. As the transistor 156 turns off, the transistor 166 is turned on for applying a positive signal to the output junction 170. This signal biases the diode 196 into a nonconductive state for allowing a signal to pass through the diode 202 and charge the memory capacitor 204 with a positive signal.

The storage of a positive signal upon the memory capacitor 204 takes place during the time that a $\overline{Q}$ signal 118, FIG. 4, is applied to the base of the transistor 172. This signal turns on the transistor 172 for turning off transistor 178 and, thus; turning off transistor 184. As transistor 184 is off, the transistor 162 is also off and the transistor 156 is allowed to be activated by the input signal at the input terminal 38. When the signal of the timing line 92 becomes a Q signal, the transistor 172 is turned off which turns on transistors 178, 184, and 162. The transistor 156 is then locked into an off position, while the current bypasses that transistor through the transistor 162. At the end of the timing signal 118, the read amplifier 54 is activated by the $\overline{Q}$ timing signal 122. This signal is applied over the timing line 96 to the transistor 172′ for turning on the read amplifier in an identical manner to that just described for the first gated amplifier 42. The potential stored on the memory capacitor 204, in the present example a positive potential, is applied to the transistors 138′, 148′, 156′, and 166′. The transistor 166′ is turned on for applying a positive signal to the lower frequency recorder 14. During the time that the timing signal 122 is applied over the line 96 to the read amplifier 54, a Q signal 124 is also being applied over the timing line 100 to the switching circuit 68. As the signal 122 changes from a Q to a $\overline{Q}$ signal, the signal 124 applied to the switching circuit 68 changes from a Q to a $\overline{Q}$ signal. This positive going signal passes through the capacitor 214 and is applied to the base of the transistor 212. Thus, the transistor 212 becomes momentarily conductive for dumping the potential stored on the memory capacitor 204. The first maximum storage device 46 is thus ready to receive a second maximum input signal from the first gated amplifier 42.

It will be seen, that the first minimum storage device 48, read amplifier 56, and switching circuit 70 operated in a manner similar to that just described. However, these circuits operate on a Q signal rather than a $\overline{Q}$ signal.

As indicated hereinabove, the second gated amplifier 44 stores information in the second maximum and minimum storage devices 50 and 52 during the time that the read amplifiers 54 and 56 read the information stored by the first gated amplifier 42 within the first maximum and minimum storage devices 46 and 48. It will be seen in FIG. 4 that the sequential storing and reading is repeated continuously for applying maximum and minimum signals to the lower frequency recorder 14 which represents the maximum and minimum value of the high frequency information signal during a given time increment. Thus, the signal applied to the lower frequency recorder 14 and ultimately recorder thereon represents a visual picture of the high frequency information signal. By compressing the amplitude data of the high frequency signal onto a lower number of cycles before recording on the lower frequency recorder, the representation that is recorded thereon may be made to appear identical to the high frequency information signal. This arrangement is illustrated in FIG. 5, as discussed hereinabove.

The recording system thus described is capable of recording a high frequency information signal upon a lower frequency recorder. This recorded high frequency information signal will appear to a visual observation to be substantially identical to the actual high frequency information signal, having an identical amplitude corresponding to the maximum and minimum amplitude of the high frequency signals and impressed upon an actually lower frequency recorded signal.

Obviously, many modifications and variations of the present invention will become apparent to those skilled in the art in light of the above teachings; and it should therefore be understood that the embodiments described hereinabove are illustrations rather than limitations of the scope of the present invention. Consequently, the present invention should be limited only by the appended claims.

The embodiments of the invention in which an exclusive property or privilege is claimed are defined as follows:

I claim:

1. A system for recording a high frequency information signal on a lower frequency recorder while retaining the visual integrity of said high frequency information, comprising;

gated amplifier means having input means for receiving said high frequency information signal and output means;

storage means connected to said output means of said gated amplifier means;

said storage means including maximum and minimum storage means for respectively storing the maximum and minimum values of said high frequency information signal;

read means connected to said maximum and minimum storage means; and timing means connected to said gated amplifier means for sequentially applying said maximum value of said high frequency information signal to said maximum storage means over a predetermined period of time and sequentially applying said minimum value thereof to said minimum storage means over a predetermined period of time;

said lower frequency recorder connected to said read means;

said timing means further connected to said read means for sequentially reading said stored maximum value of said high frequency information signal into said lower frequency recorder and then sequentially reading said stored minimum value thereof into said lower frequency recorder thereby representing said high information signal with the amplitude thereof maintained for retaining the visual integrity of said high frequency information signal during the recording thereof on said lower frequency recorder.

2. A system for recording a high frequency information signal on a lower frequency recorder as claimed in claim 1 additionally comprising, switching means connected to said maximum and minimum storage means, said timing means connected to said switching means for energizing said switching means and removing said stored maximum and minimum values of said high frequency information signal after said values are sequentially read into said lower frequency recorder.

3. A system for recording a high frequency information signal on a lower frequency recorder as claimed in claim 1 additionally comprising, said gated amplifier means including first and second amplifier means each having input means for receiving said high frequency information and output means, said storage means including said maximum and minimum storage means further including first maximum and minimum storage means connected to the output means of said first gated amplifier means, and second maximum and minimum storage means connected to the output means of said second gated amplifier means, said read means including gated read amplifier means individually connected to said first maximum and minimum storage means and to said second maximum and minimum storage means, said timing means connected to said first gated amplifier means for providing a first signal to said first maximum and minimum storage means connected thereto for a first predetermined period of time and also connected to said second gated amplifier for providing a second signal to said second maximum and minimum storage means connected thereto for a second predetermined time period, and said timing means further connected to said gated read amplifier means for providing a read signal to said lower frequency recorder from said first maximum and minimum storage means during the time the high frequency information signal is applied to said second maximum and minimum storage means and for providing a read signal to said lower frequency recorder from said second maximum and minimum storage means when said signal is applied to said first maximum and minimum storage means.

4. A system for recording a high frequency information signal on a lower frequency recorder as claimed in claim 3 additionally comprising, said switching means individually connected to said first maximum and minimum storage means and to said second maximum and minimum storage means, said timing means connected to said switching means for energizing said switching means and removing said high frequency information signal stored therein after said signal is read into said lower frequency recorder by said individual gated read amplifier means.

5. A system for recording a high frequency information signal on a lower frequency recorder as claimed in claim 4 wherein said timing means is connected to said gated read amplifier means and aid switching means for sequentially reading of the high frequency information signal into the lower frequency recorder first from the first maximum storage means, then from the first minimum storage means, then from the second maximum storage means, and then from the second minimum storage means.

6. A system for recording a high frequency information signal on a lower frequency recorder while retaining the visual integrity of said high frequency information, comprising;

input terminal means for receiving said high frequency information signal;

sampling means connected to said input terminal means including first means for sampling the maximum value of said high frequency information signal and second means for sampling the minimum value of said high frequency information signal;

storage means respectively connected to said first and second means within said sampling means for storing said maximum and minimum values of said high frequency information signal;

timing mean connected to said sampling means for applying said sampled maximum high frequency information signal to said storage means during a sequential storage time period and applying said sampled minimum high frequency information signal thereto during a second sequential storage time period; and read means connected to said storage means;

said timing means further connected to said storage means and said read means for applying said stored maximum high frequency information signal to said read means during a sequential read time period following said sequential storage time period and for applying said minimum high frequency information signal to said read means during a second sequential read time period following said second sequential storage time period;

said read means adapted for connection to said lower frequency recorder for recording said maximum and minimum values of said high frequency information signal during said sequential read time periods, whereby said high frequency information signal is represented by a lower frequency recording having amplitude integrity for retaining the visual integrity thereof.